United States Patent [19]

Fukino et al.

[11] Patent Number: 4,530,414
[45] Date of Patent: Jul. 23, 1985

[54] STEERING ASSISTANCE PRESSURE CONTROL APPARATUS

[75] Inventors: Masato Fukino, Yokohama; Tokiyoshi Yanai, Yokosuka; Hirotsugu Yamaguchi, Chigasaki; Yutaka Aoyama, Yokosuka, all of Japan

[73] Assignee: Nissan Motor Company, Limited, Yokohama, Japan

[21] Appl. No.: 471,190

[22] Filed: Mar. 1, 1983

[30] Foreign Application Priority Data

Mar. 30, 1982 [JP] Japan ................. 57-51875

[51] Int. Cl.³ ............................................. B62D 5/06
[52] U.S. Cl. .................. 180/142; 180/143; 180/148
[58] Field of Search ............. 180/143, 142, 141, 132, 180/148

[56] References Cited

U.S. PATENT DOCUMENTS 2,957,535  10/1960  Helgeson ................. 180/143
4,473,128  9/1984  Nakayama et al. ......... 180/142

FOREIGN PATENT DOCUMENTS

EP0071909  2/1983  European Pat. Off. ......... 180/143

*Primary Examiner*—John A. Pekar
*Attorney, Agent, or Firm*—Lane, Aitken & Kananen

[57] ABSTRACT

A steering pressure control apparatus for a power-assisted steering system for a vehicle including a steering power cylinder to develop a steering assistance fluid pressure, comprising a detecting unit operative to detect a state in which the steering wheel is held in an angular position turned from the straight-ahead position thereof through an angle smaller than a predetermined value and to produce an output signal when the that predetermined state is detected; and a control unit responsive to the output signal from the detecting unit and operative to control the steering assistance fluid pressure to be developed in the steering power cylinder so that the steering assistance fluid pressure is lower or higher in the presence of the signal than in the absence of the signal.

12 Claims, 12 Drawing Figures

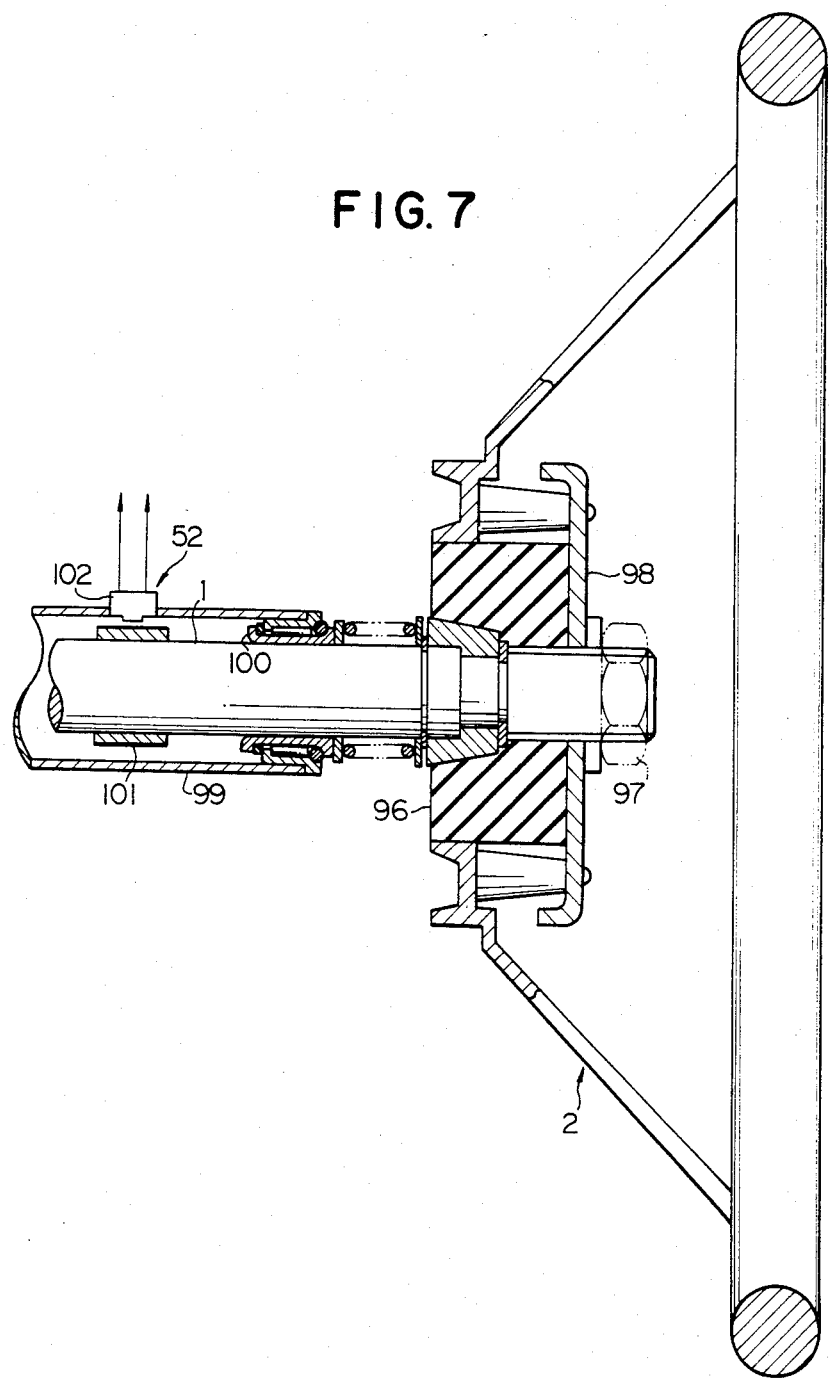

STEERING ASSISTANCE PRESSURE CONTROL APPARATUS

FIELD OF THE INVENTION

The present invention relates to steering systems for vehicles and, more particularly, to a steering pressure control apparatus for a power-assisted steering system of an automotive vehicle.

SUMMARY OF THE INVENTION

In accordance with the present invention, there is provided a steering pressure control apparatus for a power-assisted steering system for a vehicle including a steering shaft, a steering wheel rotatable with the steering shaft and a steering power cylinder to develop a steering assistance fluid pressure, comprising detecting means operative to detect a predetermined state in which the steering wheel is held in an angular position turned from the straight-ahead position thereof through an angle smaller than a predetermined value and to produce an output signal when the predetermined state is detected; and control means responsive to the output signal from the detecting means and operative to control the steering assistance fluid pressure to be developed in the steering power cylinder so that the steering assistance fluid pressure varies depending upon the presence or absence of the output signal.

BRIEF DESCRIPTION OF THE DRAWINGS

The drawbacks of a prior-art steering pressure control apparatus for a power-assisted steering system and detailed features and advantages of a steering pressure control apparatus for a power-assisted steering system according to the present invention will be clearly understood from the following description taken in conjunction with the accompanying drawings in which like reference numerals designate similar or corresponding assemblies, units, members and elements and in which:

FIG. 7 is a sectional view showing the construction of a preferred example of a wheel-velocity sensor unit incorporated in the embodiment of present invention as shown in FIG. 3;

BACKGROUND OF THE INVENTION

Figure 1:
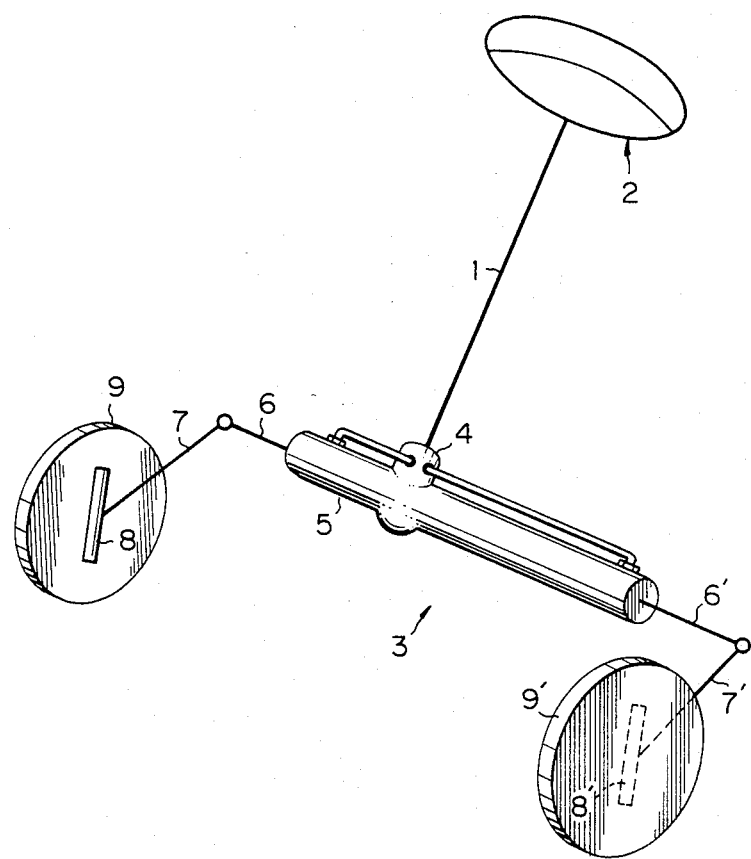
FIG. 1 is a schematic perspective view showing the overall construction of a power-assisted steering system for an automotive vehicle.

Referring to FIG. 1 of the drawings, a power-assisted steering system for an automotive vehicle comprises a steering wheel and shaft assembly which includes a steering shaft 1 carrying a steering wheel 2 at its upper end and axially extending through a hollow steering column tube (not shown). The steering system further comprises a steering gear unit 3 composed of a steering pressure control valve 4 and a double-acting steering power cylinder 5. The power cylinder 5 is herein assumed to be of the rack-and-pinion type and has included therein a pinion gear (not shown) coupled to the steering shaft 1 and held in mesh with a toothed rack member which is movable longitudinally of the housing of the power cylinder 5. The rack member has fixedly carried thereon a power piston defining two fluid chambers in the steering power cylinder 5, though not shown in the drawings. The rack member has opposite extensions 6 and 6' which project from the opposite ends of the housing of the power cylinder 5 and are pivotally connected at the opposite ends thereof to knuckle arms 7 and 7' linked to king pins 8 and 8' on the stub axles carrying front road wheels 9 and 9', respectively.

Figure 2:
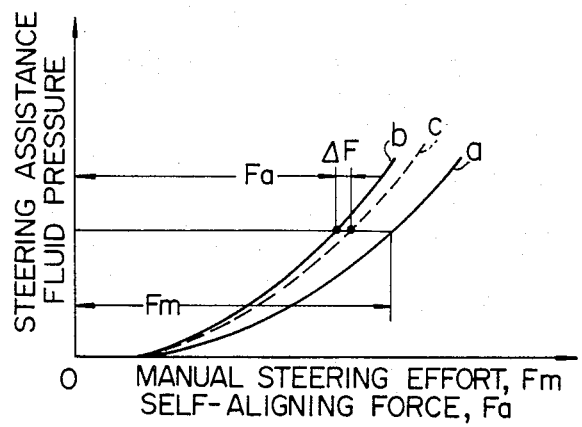
FIG. 2 is a graph showing examples of the relationship between the driver's manual steering effort and the steering assistance fluid pressure and the relationship between a direction retaining force affecting steering and the steering assistance fluid pressure as achieved in a power-assisted steering system using a conventional steering pressure control apparatus.

When a driver's steering effort is applied to the steering wheel 2 to cause the vehicle to turn a curve, the pinion gear on the steering shaft 1 is driven to turn about the center axis of the shaft 1 and causes the rack member to move in either direction with respect to the housing of the power cylinder 5. The movement of the rack member is transmitted through the knuckle arms 7 and 7' and the king pins 8 and 8' to the front road wheels 9 and 9', respectively, which are accordingly driven to turn about the center axes of the king pins 8 and 8'. In response to the turning motion of the steering shaft 1, the steering pressure control valve 4 directs fluid under pressure into one fluid chamber and out of the other fluid chamber of the power cylinder 5 depending upon the direction in which the steering wheel 2 is turned. The rack member is urged to move in either direction by the fluid pressure developed in one of the fluid chambers and acting on the power piston on the rack member. The driver's steering effort applied to the steering wheel 2 is in this fashion assisted by the fluid pressure exerted on the rack member by means of the steering power cylinder 5. When the steering wheel 2 is held in or is allowed to turn to the straight-ahead position, fluid under pressure is discharged from or directed into both of the fluid chambers of the power cylinder 5 so that the piston on the rack member is held in or moved to a neutral position. The hydraulic steering assistance achieved in the power-assisted steering system as above described is regulated to vary with some operational parameters such as the driving speed of the vehicle. In FIG. 2 of the drawings, curve a shows an example of the relationship between the driver's manual steering effort Fm and the steering assistance fluid pressure and curve b shows an example of the relationship between the direction retaining force affecting steering Fa and the steering assistance fluid pressure as regulated in a prior-art power-assisted steering system.

As well known in the art, power-assisted steering systems for automotive vehicles are generally designed to provide less steering assistance at high vehicle speeds than at low vehicle speeds. To enable a vehicle driver to have a proper feel of reaction from the steered road wheels at any vehicle speed, it is thus important that the driver's manual steering effort to be applied to the steering wheel 2 be made to vary appropriately with vehicle speeds and that the steering assistance fluid pressure to be developed in the steering power cylinder 5 be controlled to vary the driver's manual steering effort in this way. The driver's feel of the reaction of the steered road wheels is affected primarily by the ratio between the driver's manual steering effort and the direction retaining force applied to the steering wheel 2 and, for this reason, it is of importance that not only the steering assistance fluid pressure but the direction retaining force applied to the steering wheel 2 be controlled to vary with the driver's manual steering effort. In most of ordinary power-assisted steering systems for automotive vehicles, the ideal values of the direction retaining force to provide an optimum feel of reaction at given steering assistance fluid pressures are larger by a value $\Delta F$ than the direction retaining force actually produced in response to the driver's manual steering effort at the particular steering assistance fluid pressures, as indicated by curve c in FIG. 2. This means that the hydraulic steering assistance actually achieved by the steering power cylinder 5 is greater than an ideal value of the steering assistance. When an excess of steering assistance fluid pressure is developed in a predetermined state in which the steering wheel 2 is held in an angular position turned from the straight-ahead position thereof through an angle smaller than a predetermined value, the direction retaining forces applied to the steering wheel 2 is insufficient to provide the vehicle driver an adequate feel of resistance from the road wheels. Furthermore, an excessively large difference between the driver's manual steering effort and self-aligning force would cause the vehicle driver to feel excessively burdened while steering the vehicle although the driver's manual steering effort applied to the steering wheel is actually of a sufficiently small value.

In a prior-art power-assisted steering system, the difference between the driver's manual steering effort and the direction retaining force is dictated by the forces of inertia proper to some movable members of the steering system and the frictional forces produced between some slidable members of the system. Difficulties are however encountered in controlling these forces of inertia and frictional forces, with the result that the ratio between the driver's manual steering effort and the direction retaining force is invariably determined by the construction and arrangement of the steering in each vehicle. It has therefore been practically impossible to achieve an ideal ratio between the driver's manual steering effort and the direction retaining force of steering for automotive vehicles not only for different models but for similar models. If it is desired to provide an ideal ratio between the driver's manual steering effort and the direction retaining force of steering, drastic modification of the construction and rearrangement of the steering system as a whole is required since mere adjustment of the geometrical relationship among the individual component members of the steering system could not achieve the purpose.

The present invention contemplates resolution of these and other problems which have thus far been inherent in power-assisted steering systems for automotive vehicles.

DESCRIPTION OF THE PREFERRED EMBODIMENTS

Figure 3:
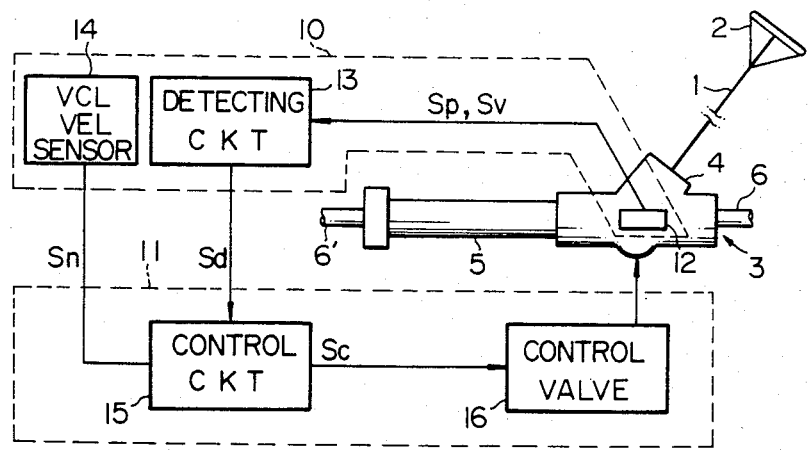
FIG. 3 is a diagram schematically showing a preferred embodiment of a steering pressure control apparatus embodying the present invention.

Referring to FIG. 3 of the drawings, a steering pressure control apparatus according to the present invention largely comprises detecting means 10 and control means 11. The detecting means 10 is adapted to detect a condition in which the direction retaining force affecting steering is being applied to the steering wheel 2 and to produce a signal Sd when such a force is being applied to the steering wheel 2 by the vehicle driver. The detecting means 10 thus comprises sensor means 12 which is provided in conjunction with the steering wheel and shaft assembly and which is adapted to detect the angular position of the steering wheel 2 about the axis of rotation thereof and the angular turning velocity at which the steering wheel 2 is being turned about the axis. The sensor means 12 is thus operative to produce a signal Sp indicative of the angular position of the steering wheel 2 about the axis of rotation thereof and a signal Sv indicative of the angular turning velocity at which the steering wheel 2 is being turned about the axis. The detecting means 10 further comprises a detecting circuit 13 responsive to the output signals Sp and Sv from the sensor means 12 and operative to determine, on the basis of these signals Sp and Sv, whether or not the steering wheel 2 is being subjected to a direction retaining force. When it is determined that a direction retaining force is being applied to the steering wheel 2, viz., the steering system is in a direction retaining state, the detecting circuit 13 produces the above mentioned signal Sd. In the steering pressure control apparatus embodying the present invention, the detecting circuit 13 is constructed and arranged to determine that the steering system is in this state when the steering wheel 2 is in an angular position turned from the straight-ahead position thereof and, in addition, the angle between the angular position and the straight-ahead position of the steering wheel 2 is less than a predetermined value. The detecting means 10 further comprises a vehicle-velocity sensor unit 14 responsive to driving velocity of the vehicle and operative to produce a signal Sn indicative of the detected vehicle velocity.

On the other hand, the control means 11 comprises a control circuit 15 which is responsive to the signal Sn from the vehicle-velocity sensor unit 14 and the signal Sd from the detecting circuit 13. The control circuit 15 is operative to determine, on the basis of these signals Sn and Sd, a degree of hydraulic steering assistance optimum for the detected vehicle velocity in a wheel-turning state or a predetermined direction retaining state of the steering system and to produce a control signal Sc indicative of a steering assistance fluid pressure to achieve such a degree of hydraulic steering assistance. The control means 11 further comprises a pressure control valve unit 16 responsive to the control signal Sc from the control circuit 15 and operative to pass fluid under pressure to the steering power cylinder 5 at a rate determined on the basis of the signal Sc.

When, now, the steering wheel 2 is being manually driven to turn about the axis of rotation thereof so as to steer the vehicle, the control circuit 15 is supplied with the output signal Sn alone in the absence of the signal Sd. The control circuit 15 thus produces, on the basis of the signal Sn, the control signal Sc indicative of a steering assistance fluid pressure to achieve a degree of hydraulic steering assistance optimum for the detected vehicle velocity. The signal Sc is fed to the pressure control valve unit 16 and enables the pressure control valve unit 16 to pass fluid under pressure to the steering power cylinder 5 at a rate determined on the basis of the signal Sc. When the steering wheel 2 thus turned is brought to a standstill in an angular position turned from the straight-ahead position thereof through an angle less than a predetermined value, the detecting circuit 13 detects such a predetermined direction retaining state from the signals Sp and Sv and delivers the signal Sd to the control circuit 15. The control circuit 15 is thus supplied with not only the signal Sn but the signal Sd and produces, on the basis of the signals Sn and Sd, the control signal Sc to achieve a degree of hydraulic steering assistance optimum for the detected vehicle velocity in this predetermined state of the steering system. The control signal Sc is supplied to the pressure control valve unit 16 and causes the pressure control valve unit 16 to pass fluid under pressure to the steering power cylinder 5 at a rate determined on the basis of the control signal Sc. The steering assistance fluid pressure represented by the control signal Sc is lower a predetermined percentage than the steering assistance fluid pressure determined in the absence of the signal Sd. The steering power cylinder 5 is thus supplied with a fluid pressure which is lower in the predetermined state than in a wheel-turning state of the steering system. The inventors' experiences tell that the percentage by which the steering assistance fluid pressure is thus reduced in a direction retaining state of the steering system as compared with the steering assistance fluid pressure in a wheel-turning state of the steering system is preferably about 80 percent of the driver's manual steering effort. It is however apparent that such a percentage may be otherwise selected so that the particular percentage approximates the ideal value indicated by the curve c in FIG. 2.

Figure 4:
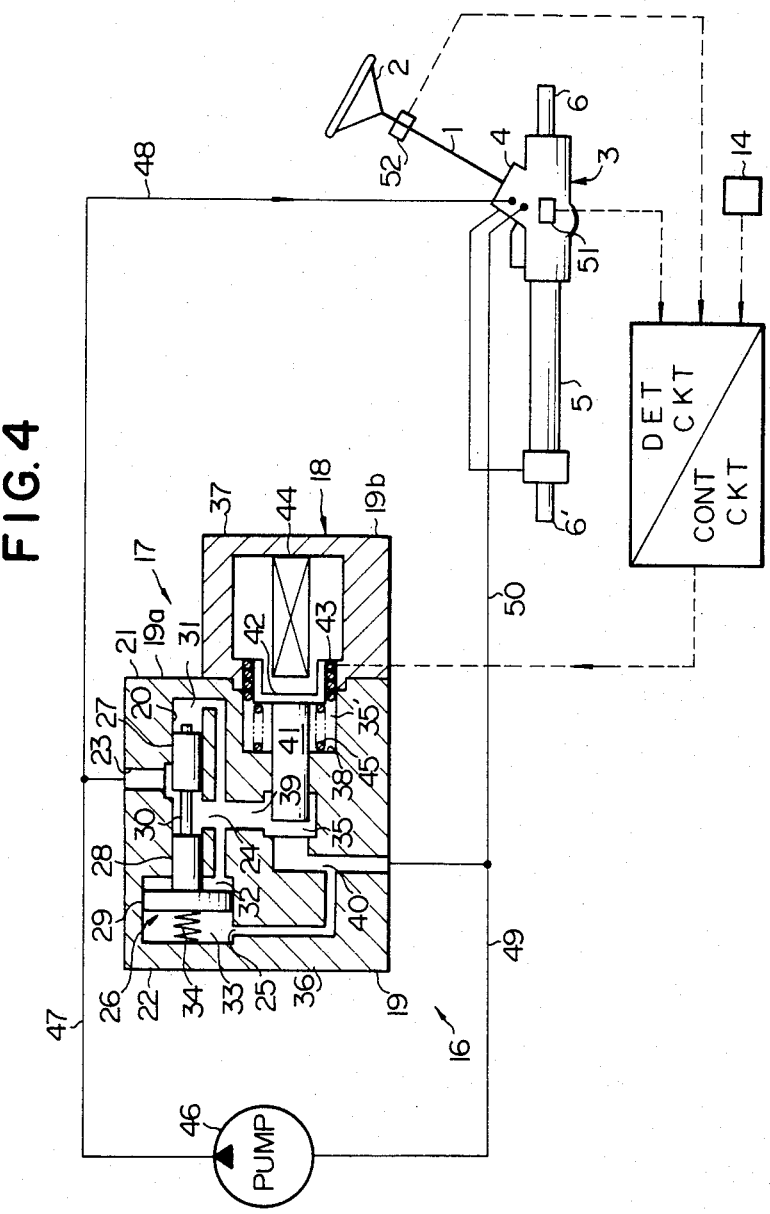
FIG. 4 is a view showing partly in section and partly in block form more detailed construction and arrangement of, particularly, a pressure control valve unit forming part of the steering pressure control apparatus shown in FIG. 3.

FIG. 4 shows detailed construction and arrangement of the embodiment or, more specifically, the pressure control valve unit 16 of the embodiment of the present invention as hereinbefore described with reference to FIG. 3. Referring to FIG. 4, the pressure control valve unit 16 comprises a combination of pressure compensating and reducing valves 17 and 18 which are arranged in series with each other in a common valve housing 19 having first and second housing portions 19a and 19b respectively having the pressure compensating and reducing valves 17 and 18 incorporated therein. The first housing portion 19a is formed with an axial cavity 20 elongated between opposite end walls 21 and 22 of the housing portion 19a and further with a fluid inlet port 23, a fluid outlet port 24 and a control fluid port 25. The pressure compensating valve 17 comprises a valve spool 26 having first, second and third circumferential lands 27, 28 and 29. The first and second lands 27 and 28 are axially spaced apart from each other and form therebetween a circumferential groove which forms part of a first fluid chamber 30 in the housing portion 19a. The first land 27 is located adjacent to the inner face of the end wall 21 and forms a second fluid chamber 31 between the end wall 21 and the land 27. The second and third lands 28 and 29 are formed adjacent to each other and form an annular third fluid chamber 32 encircling at least an axial portion of the second land 28 and a fourth fluid chamber 33 between the end wall 22 and the land 29. The fluid inlet port 23 is communicable with the first fluid chamber 30 past the first land 27 and the fluid outlet port 24 is open directly to the first fluid chamber 30 and communicates with the second and third fluid chambers 31 and 32 through passageways formed in the housing portion 19a, while the control fluid port 25 is open to the fourth fluid chamber 33. The valve spool 26 is urged to axially move in a direction to have the second and fourth fluid chambers 31 and 33 axially contracted and expanded, respectively, by a spring 34 seated between the end wall 22 and the third land 29.

On the other hand, the second housing portion 19b is formed with first and second axial cavities 35 and 35' axially arranged in series between opposite end walls 36 and 37 and partitioned from each other by an annular internal partition wall 38 forming part of the housing portion 19b. The housing portion 19b is further formed with fluid inlet and discharge ports 39 and 40 radially open to the first cavity 35 and slightly offset from each other axially of the housing portion 19b. The fluid inlet port 39 communicates with the fluid outlet port 24. The first cavity 35 is held in constant communication with the fourth fluid chamber 33. The pressure reducing valve 18 further comprises a valve spool 41 axially slidable in the first cavity 35. The valve spool 41 has an axial extension extending through an opening in the partition wall 38 into the second cavity 35' and securely connected to a carrier plate 42 in the cavity 35'. The carrier plate 42 is axially movable within the second cavity 35' and forms part of solenoid-operated spool actuating means which further comprises a coil unit 43 carried on the carrier plate 42 and a permanent magnet 44 fixedly positioned in the cavity 35' in alignment with the valve spool 41. The spool actuating means is operative so that the carrier plate 42 and accordingly the valve spool 41 are caused to axially move toward and away from the end wall 37 by the magnetic interaction between the coil unit 43 and the permanent magnet 44. The coil unit 43 has terminals connected through a suitable driver circuit (not shown) to the output terminals of the pressure control valve unit 16.

The fluid inlet port 23 of the pressure compensating valve 17 communicates with the delivery port of an engine-driven steering fluid feed pump 46 through a fluid passageway 47 and to the fluid inlet port of the steering pressure control valve 4 through a fluid passageway 48. The suction port of the pump 46 communicates with the discharge port 40 of the pressure reducing valve 18 through a fluid passageway 49 and to the fluid outlet port of the pressure control valve 4 through a fluid passageway 50. In FIG. 4, the sensor means indicated at 12 in FIG. 3 is shown consisting of a wheel-position sensor unit 51 provided in conjunction with the steering gear unit 3 and a wheel-velocity sensor unit 52 provided in conjunction with the steering wheel and shaft assembly. The wheel-position sensor unit 51 is operative to detect the angular position of the steering wheel 2 and to produce the signal Sp when the steering wheel 2 is held in the particular angular position and the wheel-velocity sensor unit 52 is operative to detect the angular turning velocity of the steering wheel 2 and to produce the signal Sv indicative of the detected angular turning velocity of the steering wheel 2.

When, now, the engine of the vehicle is in operation driving the steering fluid feed pump 46, fluid under pressure delivered from the pump 46 is directed through the fluid feed passageway 47 to the fluid inlet port 23 and through the passageway 48 to the fluid inlet port of the steering pressure control valve 4. The fluid under pressure directed to the fluid inlet port 23 is thence passed through the first fluid chamber 30 to the fluid outlet port 24 and is distributed to the second and third fluid chambers 31 and 32 and to the fluid inlet port 39 of the pressure reducing valve 18. The fluid under pressure passed to the fluid inlet port 39 and further to the fluid discharge port 40 past the valve spool 41 is directed to the control fluid port 25 of the pressure compensating valve 17 and enters the fourth fluid chamber 33 and acts upon the outer end face of the third land 29. The valve spool 26 is thus urged to axially move away from the end wall 22 by the force of the spring 34 and the force resulting from the fluid pressure acting on the outer end face of the third land 29. The valve spool 26 is urged to move in the opposite direction by the force resulting from the fluid pressure acting on the first land 27 from the second fluid chamber 31 and the force resulting from the fluid pressure acting on the annular inner end face of the third land 29 from the third fluid chamber 32. The valve spool 26 thus attempts to maintain an equilibrium axial position in the cavity 20 when the differential pressure developed between the fluid outlet port 24 and control fluid port 25 assumes a predetermined value dictated by the cross sectional area of the land 29 and the spring constant of the spring 34. The pressure compensating valve 17 is, accordingly, operative to continuously vary the fluid pressure in the fluid outlet port 24 in such a manner that the difference between the fluid pressure in the fluid inlet port 23 and the fluid pressure in the fluid outlet port 24 is maintained constant.

When the steering wheel 2 is driven to turn by a driver's manual steering effort applied thereto, the toothed rack member of the steering power cylinder 5 is caused to move in either direction. The turn of the steering wheel 2 further establishes a left-turn or right-turn driving condition in the steering pressure control valve 4 so that the fluid under pressure in the fluid feed passageway 47 leading from the delivery port of the fluid feed pump 46 enters the fluid inlet port 23 and is passed to the fluid outlet port 24 through the first fluid chamber 30 and further to the second and third fluid chambers 31 and 32 and through the fluid inlet port 39 to the fourth fluid chamber 33. The fluid under pressure admitted into the fluid chambers 31 and 32 causes the valve spool 26 to axially move in the cavity 20 against the force of the spring 34 in a direction to reduce the degree to which the fluid inlet port 23 is allowed to be open to the first fluid chamber 30. This causes reduction in the fluid pressure in the first fluid chamber 30 with the result that the differential pressure between the fluid inlet 23 and outlet ports 23 is invariably maintained constant.

On the other hand, the vehicle-velocity sensor unit 14 of the detecting means 10 detects the driving velocity of the vehicle and produces the signal Sn with a magnitude representative of the detected vehicle velocity. The signal Sn is fed to the control circuit 15 of the control means 11, and causes the control circuit 15 produce the control signal Sc. The signal Sc is supplied through a suitable driver circuit (not shown) to energize the coil unit 43 of the pressure reducing valve 18. By reason of the magnetic interaction between the coil unit 43 and the permanent magnet 44, the coil unit 43 and accordingly the valve spool 41 are caused to move away from the end wall 36 over a distance varying with the magnitude of the signal Sc supplied from the control circuit 15. When the vehicle velocity detected by the sensor unit 14 is on the increase and accordingly the coil unit 43 is energized with an increasing current, the degree of communication between the fluid inlet and discharge ports 39 and 40 of the valve 18 increases with the movement of the valve spool 41. Under these conditions, the differential pressure between the fluid inlet and outlet ports 23 and 24 remains constant irrespective of changes, if any, in the fluid pressure in the passageways 47 and 48 and in the flow rate of fluid through the fluid feed passageways 47 and 48. For this reason, the fluid passed from the fluid outlet port 24 to the fluid inlet port 39 is directed to the fluid discharge port 40 at a rate which increases with an increase in the degree to which the fluid inlet port 39 is allowed to communicate with the fluid discharge port 40 past the valve spool 41. If, conversely, the vehicle velocity detected by the sensor unit 14 is decreasing and consequently the coil unit 43 is energized with a decreasing current, the degree of communication between the fluid inlet 39 and discharge ports 40 decreases with the movement of the valve spool 41. Under these conditions, the fluid passed from the fluid outlet port 24 to the fluid inlet port 39 is directed to the fluid discharge port 40 at a rate which decreases with a decrease in the degree of communication between the fluid inlet and discharge ports 39 and 40 past the valve spool 41. Thus, the fluid under pressure in the passageways 47 and 48 is discharged through the series combination of the pressure compensating and reducing valves 17 and 18 at a rate which continuously varies with vehicle velocity when the vehicle is being steered. During steering of the vehicle, therefore, the hydraulic power assistance in the steering gear unit 3 is regulated to vary largely in inverse proportion to vehicle velocity and enables the vehicle driver to have the feel of reaction from the road wheels being steered.

When, on the other hand, the steering wheel 2 is left in the straight-ahead position, a straight-ahead or neutral driving condition is established in the steering pressure control valve 4. Under these conditions, communication is provided between the fluid inlet and outlet ports of the valve 4 so that the fluid under pressure delivered from the steering fluid feed pump 46 and directed through the fluid passageway 48 to the fluid inlet port of the pressure control valve 4 is circulated through the fluid outlet port of the valve 4 and by way of the passageway 50 to the suction port of the pump 46 or to a fluid reservoir (not shown) without being supplied to the pressure-acting chambers of the steering power cylinder 5.

Figure 5:
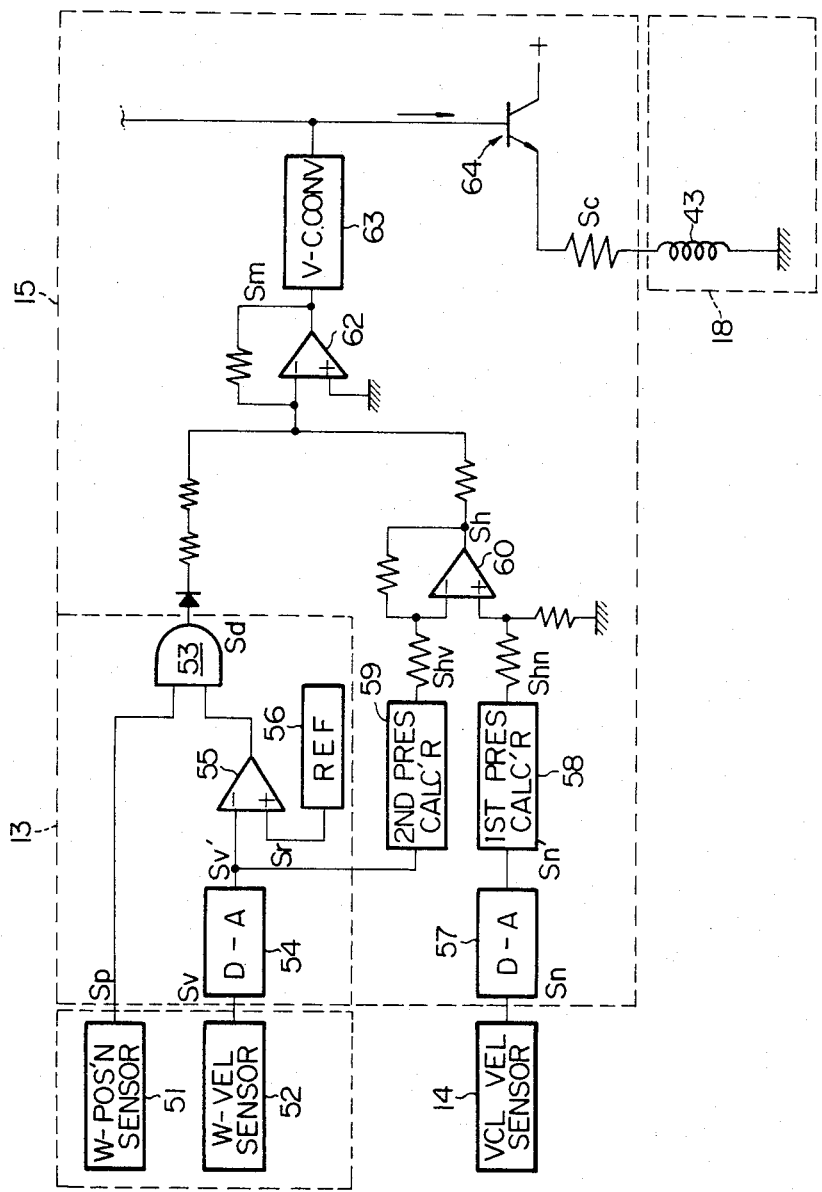
FIG. 5 is a diagram showing preferred examples of detecting and control circuits also forming part of the steering pressure control apparatus shown in FIG. 3.

FIG. 5 shows the circuit arrangements of the detecting and control circuits 13 and 15 shown in FIG. 3. The detecting circuit 13 comprises two signal input terminals connected to the wheel-position sensor unit 51 adapted to produce the signal Sp and the wheel-velocity sensor unit 52 adapted to produce the signal Sv. The signals Sp and Sv thus produced by the wheel-position and wheel-velocity sensor units 51 and 52 are herein assumed, by way of example, as digital signals. The digital output signal Sp assumes a logic "1" value when the steering wheel 2 is in an angular position turned from the straight-ahead position thereof through an angle smaller than a predetermined value about the axis of rotation of the wheel 2. Thus, the signal Sp assumes a logic "0" value when the steering wheel 2 is held in the straight-ahead position thereof or in an angular position turned from the straight-ahead position thereof through an angle larger than the predetermined value. The digital signal Sp is fed to one input terminal of a two-input logic "AND" gate circuit 53. On the other hand, the digital signal Sv is fed to a digital-to-analog converter 54 and is converted into a corresponding analog signal Sv′. The analog output signal Sv′ thus produced by the digital-to-analog converter 54 is fed to one input terminal of a comparator 55 having another input terminal connected to to a reference signal generator 56 adapted to constantly supply to the comparator 55 a reference signal Sr with a magnitude representative of a predetermined angular turning velocity of the steering wheel 2. The comparator 55 thus supplied with the analog signal Sv′ and the reference signal Sr is operative to compare the former with the latter and to produce a logic logic "1" signal when the signal Sv′ is lower in magnitude than the reference signal Sr. The comparator 55 has an output terminal connected to the other input terminal of the logic "AND" gate circuit 53, which is accordingly operative to produce a logic "1" output signal when the steering wheel 2 is in an angular position turned from the straight-ahead position thereof through an angle lower than a predetermined value and is being turned at an angular turning velocity lower than a predetermined value, viz., when the steering system is in a predetermined state in which the steering wheel 2 is held in an angular position turned from the straight-ahead position thereof through an angle smaller than a predetermined value. The logic "1" output signal or logic "0" output signal thus appearing at the output terminal of the logic "AND" gate circuit 53 is fed to the control circuit 15 as the signal Sd.

The control circuit 15 has two input terminals one of which is connected to the output terminal of the digital-to-analog converter 54 and the other of which is connected to the vehicle-velocity sensor unit 14 adapted to produce the signal Sn. The signal Sn is herein assumed to be a digital signal. The digital output signal Sn is fed to a digital-to-analog converter 57 and is converted into a corresponding analog signal Sn′. The analog output signal Sn′ is fed to a first assistance-pressure calculator 58 adapted to produce an analog signal Shn which has a magnitude representative of a steering assistance fluid pressure variable in predetermined relationship with the input signal Sn′. On the other hand, the analog output signal Sv′ produced by the digital-to-analog converter 54 is fed to a second assistance-pressure calculator 59 which is adapted to produce an analog signal Shv having a magnitude representative of a steering assistance fluid pressure variable in predetermined relationship with the input signal Sv′. The analog output signals Shn and Shv are supplied through suitable resistors to input terminals of a first operational amplifier 60. The first operational amplifier 60 is constructed to serve as a subtractor and is operative to subtract the signal Shv from the signal Shn and to produce an analog output signal Sh with a magnitude representative of the difference in magnitude therebetween. The operational amplifier 60 has an output terminal connected through a resistor to an input terminal of a second operational amplifier 62.

The output terminal of the logic "AND" gate circuit 53 is likewise connected through a reverse-flow preventive diode and a series combination of resistors to the operational amplifier 62. The second operational amplifier 62 is constructed as a summing circuit and is thus operative to produce an analog signal Sm with a magnitude representative of the sum of respective magnitudes of the digital output signal Sd, viz., the logic "0" or "1" output signal from the "AND" gate circuit 53 and the analog output signal Sh from the first operational amplifier 60. The analog signal Sm is fed to a suitable current generating circuit such as a voltage-to-current converter 63 and is thereby converted into a current continuous variable with the sum of the respective magnitudes of the signals Sh and Sd. The current thus produced by the voltage-to-current converter 63 is applied to the base electrode of an n-p-n transistor 64 having its collector electrode connected to a suitable source (not shown) of a positive d.c. power source and its emitter electrode connected through a resistor to the coil unit 43 of the pressure reducing valve 18. The transistor 64 is, thus, operative to supply to the coil unit 43 a control signal Sc variable with the current supplied from the voltage-to-current converter 63.

When, now, the steering wheel 2 is held in the straight-ahead position thereof or in an angular position turned from the straight-ahead position through an angle larger than a predetermined value or the driver's manual effort is being applied to the steering wheel 2 so that the steering wheel 2 is turned from the straight-ahead position at an angular turning velocity higher than the predetermined value represented by the reference signal Sr impressed on one input terminal of the comparator 55, the logic "AND" gate circuit 53 is held in a state producing a logic "0" signal at its output terminal. Under these conditions, the second operational amplifier 62 is supplied with a logic "0" signal from the logic "AND" gate circuit 53 and the analog signal Sh from the first operational amplifier 60. The coil unit 43 is thus energized with a current proportional to or otherwise continuously variable with such an analog output signal Sh from the first operational amplifier 60. The valve spool 41 of the pressure reducing valve 18 is, accordingly, driven to move a distance varying with such a current supplied to the coil unit 43 so that the fluid under pressure admitted to the pressure reducing valve 18 past the valve spool 26 is discharged from the fluid discharge port 40 at a rate which increases or decreases as the difference between the detected vehicle velocity and the detected angular turning velocity of the steering wheel 2 being turned decreases or increases, respectively.

Under the predetermined direction-retaining state of the steering system, on the other hand, the steering wheel 2 is turned from the straight-ahead position thereof through an angle smaller than a predetermined value and at an angular turning velocity lower than the predetermined value represented by the reference signal Sr impressed on the comparator 55. Under these conditions, the logic "AND" gate circuit 53 is held in a state producing a logic "1" signal at its output terminal. The logic "1" signal is added to the analog output signal Sh from the second operational amplifier 62. The coil unit 43 is thus energized with a current which is variable with the difference between the detected vehicle velocity and the detected angular turning velocity of the steering wheel 2 and which is higher by a value corresponding to the logic "1" output signal from the "AND" gate circuit 53 than the current supplied to the coil unit 43 when the steering wheel 2 is being turned by a driver's manual steering effort applied to the steering wheel 2. Under the predetermined direction-retaining state, the valve spool 41 of the pressure reducing valve 18 is, accordingly, driven to move a distance longer than in a wheel-turning state so that the fluid under pressure admitted to the pressure reducing valve 18 is discharged from the fluid discharge port 40 at the higher rate which increases or decreases as the difference between the detected vehicle velocity and the detected angular turning velocity of the steering wheel 2 being turned decreases or increases, respectively.

The control circuit 15 is adapted to provide a hydraulic steering assistance smaller in the predetermined wheel-turning state. Such a control circuit 15 can however be readily modified, if desired, in such a manner that a larger hydraulic steering assistance is provided in the predetermined state than in a wheel-turning state. For this purpose, the second operational amplifier 62 which has been described as being constructed as a summing circuit may be constituted as a subtractor circuit operative to subtract the logic "0" or "1" output signal from the "AND" gate circuit 53 from the signal Sh delivered from the first operational amplifier 60.

Figure 6:
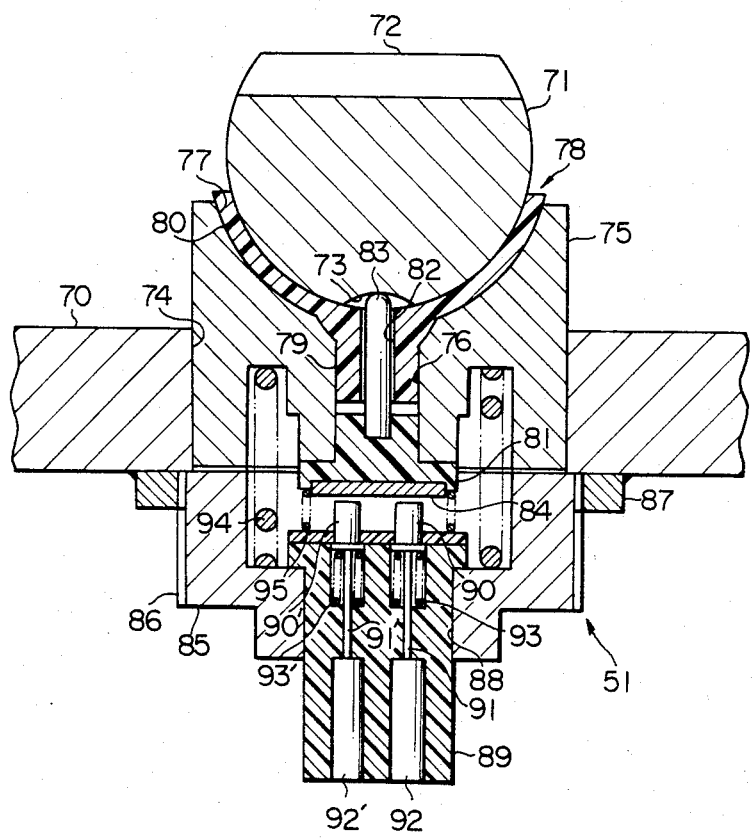
FIG. 6 is a sectional view showing the construction of a preferred example of a wheel-position sensor unit incorporated in the embodiment of present invention as shown in FIG. 3.

FIG. 6 shows a preferred example of the detailed construction of the wheel-position sensor unit 51 provided in the steering pressure control apparatus embodying the present invention. The wheel-position sensor unit 51 is arranged in conjunction with the steering gear unit 3 (FIG. 1) which is shown comprising a housing 70 held stationary with respect to the vehicle body and an elongated toothed rack member 71 longitudinally movable with respect to the housing 70. The rack member 71 has an elongated toothed portion 72 formed with a series of teeth angled to the direction of elongation of the rack member 71. The rack member 71 is further formed with a recess 73 which is open opposite to the toothed portion 72 and which is located in predetermined relationship to the housing 70 and accordingly to the vehicle body structure when the steering wheel 2 (FIG. 1) is held in the neutral or straight-ahead position thereof. The housing 70 is formed with an opening 74 having received therein a generally cylindrical slidable member 75 which is slidable toward and away from the rack member 71 in directions perpendicular to the directions of movement of the rack member 71 with respect to the housing 70. The slidable member 75 is formed with a slot 76 elongated in the directions of movement of the slidable member 75 with respect to the rack member 71 and a generally semicylindrical concavity 77 merging out of the slot 76 and open toward the rack member 71. A bushing 78 has a stem portion 79 closely received in the slot 76, a generally semicylindrical bearing portion 80 received in the semicylindrical concavity 77 and a flat seat portion 81 received on an end face portion of the slidable member 75 opposite to the rack member 71. The bushing 78 is further formed with a blind bore 82 extending through the stem portion 79 thereof and open perpendicularly toward the rack member 71. A pin 83 is secured at one end in the stem portion 79 of the bushing 78 and axially extends toward the rack member 71 into the semicylindrical concavity 77 in the bushing 78. The blind bore 82 in the bushing 78 and the recess 73 in the rack member 71 are located so that the recess 73 is aligned with the pin 83 when the rack member 71 assumes a predetermined position with respect to the housing 70 by the steering wheel 2 (FIG. 1) held in the neutral or straight-ahead position thereof. When the steering wheel 2 is turned in either direction from the straight-ahead position thereof and as a consequence the rack member 71 is driven to lengthwise move in either direction with respect to the housing 70, the recess 73 in the rack member 71 is displaced from the location aligned with the pin 83. The recess 73 is slightly elongated longitudinally of the rack member 71 so that the pin 83 is aligned with the recess 73 when the steering wheel 2 assumes an angular position turned in one direction or another from the straight-ahead position thereof through a certain angle about the axis of rotation of the steering wheel 2. The seat portion 81 of the bushing 78 has securely attached to its outer face an electrically conductive strip member 84. The bushing 78 as a whole or at least the seat portion 81 thereof is constructed of an electrically non-conductive material such as a synthetic resin.

The wheel-position sensor unit 51 shown in FIG. 6 further comprises a generally cylindrical, hollow receptacle member 85 located in alignment with the slidable member 75 and having a threaded outer peripheral wall 86. The receptacle member 85 is adjustably fitted to the housing 70 by means of a nut 87 welded or otherwise securely attached to the housing 70 and engaging the threaded outer wall 86. The receptacle member 85 is formed with an axial bore 88 aligned with the conductive strip member 84 and has securely fitted therein a plug member 89 constructed of an electrically non-conductive material such as a synthetic resin and positioned opposite to the rack member 71 across the bushing 78. The plug member 89 projects toward and is aligned with the conductive strip member 84. A pair of contact elements 90 and 90' are secured to the inner end face of the plug member 89 and project toward the conductive strip member 84. The contact elements 90 and 90' are connected to lead lines 91 and 91', respectively, which extend through the plug member 89 and which are connected to terminal elements 92 and 92', respectively, embedded in the plug member 89. The contact elements 90 and 90' are axially slidable in the plug member 89 and are urged to project toward the conductive strip member 84 by, for example, preloaded helical compression springs 93 and 93' provided within blind bores formed in the plug member 89 as shown. The slidable member 75 is urged away from the receptacle member 85 toward the rack member 71 by suitable biasing means. In the arrangement shown in FIG. 6, the biasing means is shown comprising a preloaded main compression spring 94 seated at one end thereof on an annular internal face of the slidable member 75 and at the other end thereof on an annular internal face of the receptacle member 85 and a preloaded auxiliary compression spring 95 seated at one end thereof on the seat portion 81 of the bushing 78 and at the other end thereof on the inner end face of the plug member 89 as shown. The slidable member 75 being thus urged away from the receptacle member 85 by means of the springs 94 and 95, the semicylindrical bearing portion 80 of the bushing member 78 is closely received and pressed upon between the rack member 71 and the semicylindrically sunk surface portion of the slidable member 75 as shown and, furthermore, the conductive strip member 84 is spaced apart from the contact elements 90 and 90'. Though not shown in the drawings, the terminal elements 92 and 92' are connected to external conductor wires which are connected across a d.c. power source to one input terminal of the logic "AND" gate circuit 53.

When, now, the steering wheel 2 (FIG. 1) is held in the straight-ahead position thereof or in any angular position turned from the straight-ahead position through an angle smaller than a predetermined value so that the rack member 71 assumes a corresponding position with respect to the housing 70, the recess 73 is aligned with the pin 83 so that the pin 83 is allowed to project into the recess 73. The slidable member 75 and the bushing 78 are thus held in positions having the conductive strip member 84 spaced apart from the contact elements 90 and 90'. The conductive strip member 84 is thus electrically disconnected from the contact elements 90 and 90' so that a logic "0" signal signal appears at the output terminal of the sensor unit 51. When the steering wheel 2 is turned from or away from the straight-ahead position thereof and accordingly the rack member 71 is lengthwise moved in either direction with respect to the slidable member 75, the recess 73 is dislodged from the position aligned with the pin 83 with the result that the pin 83 and accordingly the slidable member 75 and the bushing 78 as well are caused to axially move toward the receptacle member 85 against the forces of the main and auxiliary compression springs 94 and 95. The conductive strip member 84 is therefore brought into contact with the contact elements 90 and 90' so that electrical connection is provided between the contact elements 90 and 90' through the strip member 84. A logic "1" signal signal is accordingly produced at the output terminal of the sensor unit 51 and is fed to one input terminal of the logic "AND" gate circuit 53.

FIG. 7 of the drawings shows a preferred example of the detailed construction of the wheel-velocity sensor unit 52 of the steering pressure control apparatus embodying the present invention. The steering wheel 2 is coupled to the steering shaft 1 by means of a resilient bushing 96 secured to a rear end portion of the shaft 1 with a nut 97 tightened to a retainer plate 98 attached to the rear end face of the bushing 96. The steering shaft 1 extends through a hollow steering column tube 99 secured to the body structure of the vehicle and has an axial portion journaled in a bearing 100 received on the inner peripheral surface of the steering column tube 99. The steering shaft 1 is thus rotatable about the center axis thereof with respect to the steering column tube 99.

The steering wheel and shaft assembly being constructed as above described, the wheel-velocity sensor unit 52 comprises a hollow, cylindrical magnet member 101 securely received on an axial portion of the steering shaft 1, and an electromagnetic pickup element 102 fixedly mounted on the steering column tube 99. The cylindrical magnet member 101 is magnetized in such a manner as to have a plurality of north and south pole portions which are arranged alternately to one another circumferentially of the magnet member 101. The electromagnetic pickup element 102 is located at a spacing from the outer peripheral surface of the magnet member 101 and is adapted to produce pulses as the alternately arranged north and south pole portions of the magnet member 101 are moved closer to and away from the element 102 when the magnet member 101 is turned about the center axis thereof. When the steering wheel 2 is turned in either direction at a certain velocity, pulses are produced by the pickup element 102 at a frequency which varies with the turning velocity of the steering wheel 2 and accordingly with the rate at which the angle through which the steering wheel 2 is being turned away from or toward the straight-ahead position thereof varies in terms of time. Though not shown, the electromagnetic pickup element 102 has terminal elements which are connected across a suitable d.c. power source to the input terminal of the digital-to-analog converter 54 of the detecting circuit 13 in the circuit arrangement shown in FIG. 5. The digital-to-analog converter 54 is, thus, adapted to produce an analog signal Sv' which varies in magnitude with the frequency of the pulses thus delivered from the pickup element 102.

Figure 8A:
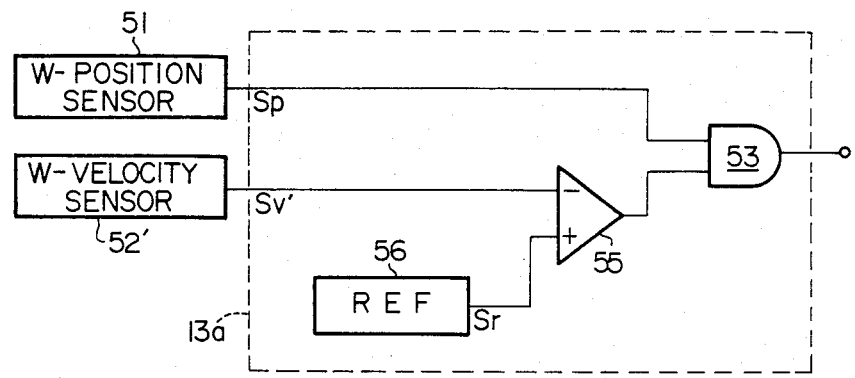
FIGS. 8A, 8B and 8C are block diagrams showing modifications of detecting means included in the circuit arrangement shown in FIG. 5.
Figure 8B:
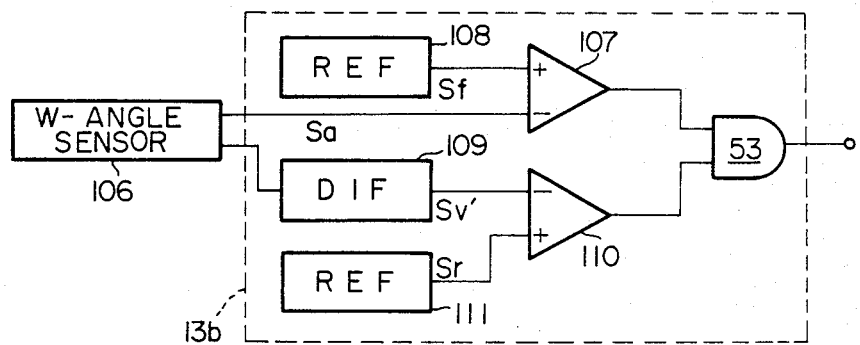
Figure 8C:
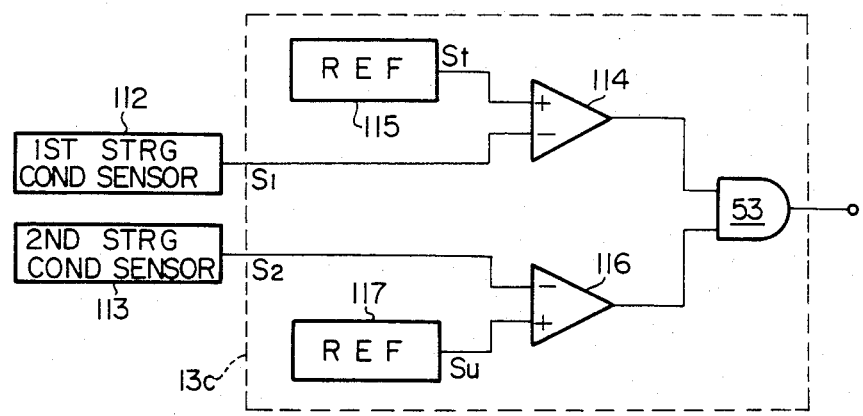

FIGS. 8A, 8B and 8C show modifications of the detecting circuit 13 of the arrangement shown in FIG. 5.

The detecting circuit 13a shown in FIG. 8A is provided in combination with a wheel-velocity sensor unit 52' which is adapted to detect the angular position of the steering wheel 2 (FIG. 1) and to produce an analog output signal Sv' in lieu of the digital output signal Sv produced by the wheel-velocity sensor unit 52 of, for example, the nature hereinbefore described with reference to FIG. 5. The wheel-velocity sensor unit 52' is, thus, connected directly to one input terminal of the comparator 55 without intervention of an analog-to-digital converter therebetween.

In the detecting circuit 13b shown in FIG. 8B, both the angular position and angular turning velocity of the steering wheel 2 (FIG. 1) are detected from a signal produced by a wheel-angle sensor unit 106 adapted to detect the turning angle of the steering wheel 2 from the straight-ahead position thereof and to produce an analog output signal Sa with a magnitude representative of the detected turning angle of the steering wheel 2 from the straight-ahead position. The analog signal Sa is fed to one input terminal of a first comparator 107 having another input terminal connected to a first reference signal generator 108 adapted to constantly supply to the comparator 107 a reference signal Sf with a magnitude representative of the turning angle (zero degrees) of the steering wheel 2 from the straight-ahead position thereof. The first comparator 107 is operative to compare the magnitude of the output signal Sa with the magnitude of the reference signal Sf and to produce a logic "0" output signal when the signal Sa is equalized or largely equalized in magnitude with the reference signal Sf, viz., the steering wheel 2 is held in the straight-ahead position thereof or in an angular position approximating the straight-ahead position. If the signal Sa is smaller in magnitude than the reference signal Sf, then the first comparator 107 produces a logic "1" output signal. The output signal Sa is fed not only to the first comparator 107 but to a differentiator 109 adapted to differentiate the magnitude of the signal Sa with respect to time and accordingly to produce an analog output signal Sv' having a magnitude representative of the angular turning velocity of the steering wheel 2. The analog signal Sv' is fed to one input terminal of a second comparator 110 having another input terminal connected to a second reference signal generator 111 adapted to constantly supply to the comparator 110 a reference signal Sr with a magnitude representative of a predetermined angular turning velocity of the steering wheel 2. The second comparator 110 is operative to compare the magnitude of the output signal Sv' with the magnitude of the reference signal Sr and to produce a logic "1" output signal when the signal Sv' is smaller in magnitude than the reference signal Sr, viz., the angular turning velocity of the steering wheel 2 is lower than the velocity represented by the reference signal Sr. If the signal Sv' is larger in magnitude than the reference signal Sr, then the second comparator 110 produces a logic "0" output signal. The first and second comparators 107 and 110 have output terminals respectively connected to the input terminals of a logic "AND" gate circuit 53.

On the other hand, the detecting circuit 13c shown in FIG. 8C is provided with first and second steering condition sensor units 112 and 113. The first steering condition sensor unit 112 is provided in conjunction with any movable member such as, for example, a pitman arm or an idler arm (not shown) or the knuckle arm 7 or 7' (FIG. 1) of the steering linkage and is operative to detect the velocity at which the rockable arm is being moved with respect to the body structure of the vehicle and to produce an analog steering condition signal $S_1$ representative of the velocity thus detected. The analog signal $S_1$ is fed to one input terminal of a first comparator 114 having another input terminal connected to a first reference signal generator 115 adapted to constantly supply to the comparator 114 a reference signal St with a magnitude representative of a predetermined velocity of motion of the above mentioned movable member. The first comparator 114 is operative to compare the magnitude of the output signal $S_1$ with the magnitude of the reference signal St and to produce a logic "0" output signal when the signal $S_1$ is in predetermined relationship to the reference signal St, the predetermined relationship being such that the steering wheel 2 is held in the straight-ahead position thereof. When such a relationship is not established between the signals $S_1$ and St, then the first comparator 114 produces a logic "1" output signal. On the other hand, the second steering condition sensor unit 113 is adapted to detect the angle of a pitching, rolling or yawing motion or any motion of the vehicle body structure about a predetermined axis and to produce an analog steering condition signal $S_2$ representative of the angle of such a motion of the vehicle body structure thus detected. The analog signal $S_2$ is fed to one input terminal of a second comparator 116 having another input terminal connected to a second reference signal generator 117 adapted to constantly supply to the comparator 116 a reference signal Su with a magnitude representative of a predetermined angle of pitching, rolling or yawing motion of the vehicle body structure. The second comparator 116 is operative to compare the magnitude of the output signal $S_2$ with the magnitude of the reference signal Su and to produce a logic "1" output signal when the signal $S_2$ is in predetermined relationship to the reference signal Su. In this instance, the predetermined relationship between the signals $S_2$ and Su is such that the steering wheel 2 is being turned away from or toward the straight-ahead position thereof at a velocity lower than a predetermined value. When such a relationship is not established between the signals $S_2$ and Su, the second comparator 116 produces a logic "0" output signal. The first and second comparators 114 and 116 have output terminals respectively connected to the input terminals of a logic "AND" gate circuit 53.

Figure 9:
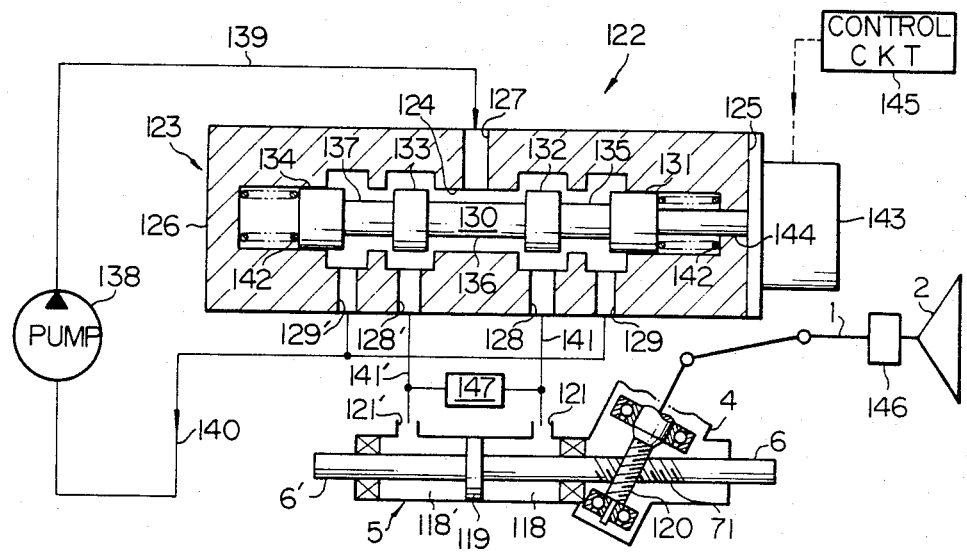
FIG. 9 is a sectional view showing a modification of the pressure control valve unit included in the steering pressure control apparatus shown in FIG. 4.

FIG. 9 shows a modification of the steering pressure control apparatus described with reference to FIG. 4. In FIG. 9, the steering power cylinder 5 previously described with reference to FIG. 1 is shown having first and second fluid chambers 118 and 118' which are separate from each other by a piston 119 securely mounted on or integral with the rack member 71 held in mesh with the pinion gear 120 on the steering shaft 1. The power cylinder 5 is of the double-acting type and has first and second fluid ports 121 and 121' communicating with these fluid chambers 118 and 118', respectively.

The steering pressure control apparatus shown in FIG. 9 comprises a pressure control valve unit 122 which is an alternative of the pressure control valve unit 16 provided in the steering pressure control apparatus described with reference to FIG. 4. The pressure control valve unit 122 comprises a housing 123 formed with an axial cavity 124 elongated between opposite end walls 125 and 126 of the housing 123 and further with a fluid inlet port 127, first and second fluid outlet ports 128 and 128' and first and second fluid discharge ports 129 and 129'. A valve spool 130 having first, second, third and fourth circumferential lands 131, 132, 133 and 134 is axially slidable through the cavity 124. The first, second, third and fourth lands 131, 132, 133 and 134 are axially spaced apart from one another and thus form a first groove 135 between the first and second lands 131 and 132, a second groove 136 between the second and third lands 132 and 133, and a third groove 137 between the third and fourth lands 133 and 134. The first and fourth lands 131 and 134 are formed at the opposite ends of the valve spool 130. The fluid inlet port 127 communicates with the delivery port of a fluid feed pump 138 through a fluid passageway 139, while the first and second fluid discharge ports 129 and 129' communicate with the suction port of the pump 138 through a fluid discharge passageway 140. The first and second fluid outlet ports 128 and 128' communicate with the first and second fluid chambers 118 and 118', respectively, of the steering power cylinder 5 through fluid passageways 141 and 141' and the first and second fluid ports 121 and 121', respectively.

When the valve spool 130 is held in a neutral position in the cavity 124 as shown, fluid communication is established from the fluid inlet port 127 to both of the first and second fluid outlet ports 128 and 128' through the second groove 136 and, past the second and third lands 132 and 133, further to the first and second fluid discharge ports 129 and 129'. As the valve spool 130 is moved in one direction in the cavity 24, viz., rightwardly in FIG. 9 from the neutral position thereof, the degree of communication between the fluid inlet port 127 and the first fluid outlet port 128 increases and the degree of communication between the fluid inlet port 127 and each of the second fluid outlet port 128' and the first and second fluid discharge ports 129 and 129' decreases until finally the communication between the fluid inlet port 127 and the first fluid discharge port 129 is blocked by the second land 132 and the communication between the fluid inlet port 127 and each of the second fluid outlet and discharge ports 128' and 129' is blocked by the third land 133. When the valve spool 130 is being moved in this direction, the fluid pressure delivered from the fluid feed pump 138 is directed through the fluid inlet port 127, past the second land 132 of the valve spool 130, through the first fluid outlet port 128 and by way of the fluid passageway 141 to the first fluid chamber 118 of the steering power cylinder 5, forcing the rack member 71 to longitudinally move in one direction through the power cylinder 5. As the valve spool 130 is longitudinally moved in the opposite direction in the cavity 124, viz., leftwardly in FIG. 9 from the neutral position thereof, the degree of communication between the fluid inlet port 127 and the second fluid outlet port 128' increases and the degree of communication between the fluid inlet port 127 and each of the first fluid outlet port 128 and the first and second fluid discharge ports 129 and 129' decreases until finally the communication between the fluid inlet port 127 and the second fluid discharge port 129' is blocked by the third land 133 and the communication between the fluid inlet port 127 and each of the first fluid outlet and discharge ports 128 and 129 is blocked by the second land 132. When the valve spool 130 is being moved in this direction, the fluid pressure delivered from the pump 138 is directed through the fluid inlet port 127, past the third land 133, through the second fluid outlet port 128' and by way of the fluid passageway 141' to the second fluid chamber 118' of the steering power cylinder 5, forcing the rack member 71 to longitudinally move in the other direction through the power cylinder 5.

The valve spool 130 is urged to stay in the neutral position thereof in the cavity 124 by suitable biasing means which is shown comprising a first preloaded helical compression spring 142 seated between the outer end face of the first land 131 of the spool 130 and the inner end face of the end wall 125 of the housing 123 and a second preloaded helical compression spring 142' seated between the outer end face of the fourth land 134 of the spool 130 and the inner end face of the end wall 126 of the housing 123. The valve spool 130 is driven to move in one direction or the other from the neutral position thereof by means of a solenoid-operated actuator unit 143 which comprises a plunger 144 axially projecting into the cavity 124 through one of the end walls such as the end wall 125 of the housing 123 and connected at its leading end to the first land 131 of the valve spool 130. The actuator unit 143 has incorporated therein a solenoid coil (not shown) which is electrically connected to the output terminal of a suitable control circuit 145 which may be constructed and arranged similarly to the control circuit 15 previously described with reference to FIG. 5. In the arrangement shown in FIG. 9, the control circuit 145 has two signal input terminals one of which is connected to a steering torque sensor unit 146 and the other of which is connected to a differential pressure sensor unit 147. The steering torque sensor unit 146 is provided in conjunction with the steering shaft 1 and is operative to detect a torque with which the steering shaft 1 is turned and to produce an output signal having a magnitude representative of the detected torque imparted to the steering shaft 1. On the other hand, the differential pressure sensor unit 147 is provided between the fluid passageways 141 and 141' and is operative to detect a difference between the fluid pressures developed in these passageways 141 and 141', viz., in the first and second fluid outlet ports 128 and 128' of the valve unit 122 and to produce an output signal representative of the detected differential pressure therebetween.

Figure 10:
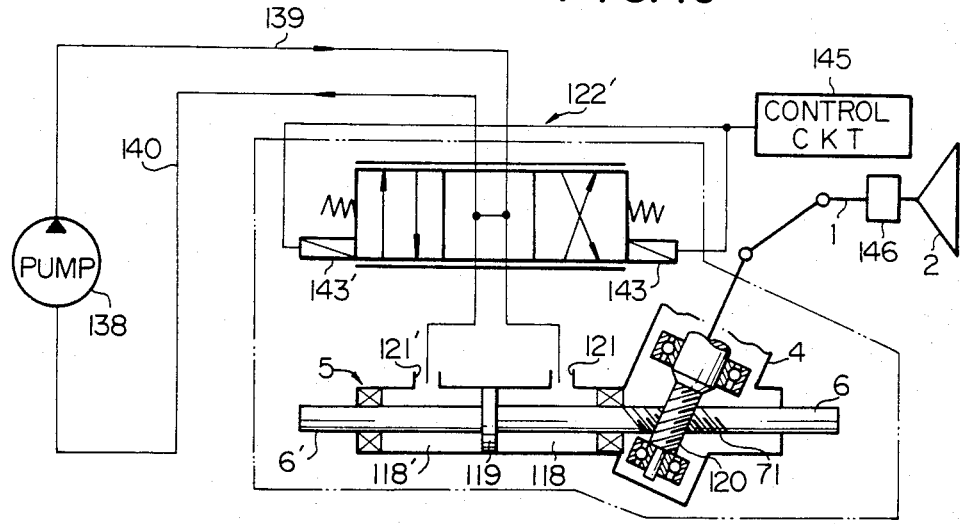
FIG. 10 is a view showing partly in section and partly in schematic form a further modification of the valve unit shown in FIG. 9.

While the valve spool 130 of the pressure control valve unit 122 hereinbefore described with reference to FIG. 9 is driven to move from the neutral position by means of a single actuator unit 143, such a valve unit 122 may be modified so that the valve spool 130 is driven to move in opposite directions by two solenoid-operated actuator units. FIG. 10 shows schematically an example of such a valve unit 122'. The valve unit 122' has first and second solenoid-operated actuator units 143 and 143' each similar to the actuator unit 143 of the valve unit 122 shown in FIG. 9 and have incorporated therein solenoid coils (not shown) which are connected commonly to the control circuit 145.

What is claimed is:

1. A steering pressure control apparatus for a power-assisted steering system for a vehicle including a steering shaft, a steering wheel rotatable with the steering shaft and a steering power cylinder to develop a steering assistance fluid pressure, comprising:

detecting means operative to detect a predetermined state in which the steering wheel is held in an angular position turned from the straight-ahead position thereof through an angle smaller than a predetermined value and to produce an output signal when said predetermined state is detected; and control means responsive to said output signal and operative to control the steering assistance fluid pressure to be developed in said steering power cylinder so that the steering assistance fluid pressure is lower in the presence of said signal than in the absence of the signal.

2. A steering pressure control apparatus for a power-assisted steering system for a vehicle including a steering shaft, a steering wheel rotatable with the steering shaft and a steering power cylinder to develop a steering assistance fluid pressure, comprising:

detecting means operative to detect a predetermined state in which the steering wheel is held in an angular position turned from the straight-ahead position thereof through an angle smaller than a predetermined value and to produce an output signal when said predetermined state is detected; and control means responsive to the output signal and operative to control the steering assistance fluid pressure to be developed in said steering power cylinder so that the steering assistance fluid pressure is higher in the presence of said signal than in the absence of the signal.

3. A steering pressure control apparatus as set forth in claim 1 or 2, in which said detecting means comprises vehicle-speed sensor means operative to detect driving speed of the vehicle and to produce an output signal representative of the detected vehicle speed and in which said control means is operative to control said steering assistance fluid pressure in such a manner that the fluid pressure varies with said output signal.

4. A steering pressure control apparatus as set forth in claim 3, in which said detecting means further comprises wheel-position sensor means operative to detect an angular position of the steering wheel through an angle smaller than said predetermined value and to produce an output signal, and wheel-velocity sensor means operative to detect angular turning velocity of the steering wheel and to produce an output signal representative of the detected turning velocity of the steering wheel, said control means being operative to detect said predetermined state on the basis of said output signal from the wheel-position sensor means and said output signal from the wheel-velocity sensor means.

5. A steering pressure control apparatus as set forth in claim 4, in which said detecting means further comprises a detecting circuit comprising comparing means operative to compare the output signal from said wheel-velocity sensor means with a reference signal representative of a predetermined angular turning velocity of the steering wheel and to produce an output signal when said output signal is in a predetermined relationship to the reference signal, and a logic circuit responsive to the output signal from said wheel-position sensor means and the output signal from said comparing means and operative to produce a logic output signal when the respective output signals from said wheel-position sensor means and said comparing means are in predetermined relationship to each other.

6. A steering pressure control apparatus as set forth in claim 5, in which said control means comprises a control circuit and a fluid-operated control valve unit, the control circuit being electrically connected to said detecting circuit and comprising first assistance-pressure calculating means responsive to the output signal from said vehicle-speed sensor means and operative to produce an output signal representative of a steering assistance fluid pressure variable in predetermined relationship with the output signal from the vehicle-speed sensor means, second assistance-pressure calculating means responsive to the signal from said wheel-velocity sensor means and operative to produce an output signal representative of a steering assistance fluid pressure variable in predetermined relationship with the output signal, a first operational circuit responsive to the respective output signals from the first and second steering-pressure calculating means and operative to produce an output signal representative of a relationship between the signals from the two calculating means, and second operational circuit responsive to the output signal from said logic circuit and the output signal from said first operational circuit and operative to produce an output signal representative of a relationship between the signals from the logic circuit and the first operational circuit, said control valve unit comprising electromagnetically-operated actuating means being being operative to control the steering assistance fluid pressure in accordance with the signal from the second operational circuit.

7. A steering pressure control apparatus as set forth in claim 3, in which said detecting means further comprises wheel-angle sensor means operative to detect a turning angle of the steering wheel from the straight-ahead position thereof and to produce an output signal representative of the detected turning angle of the steering wheel, and a detecting circuit comprising first comparing means operative to compare said output signal from the wheel-angle sensor means with a first reference signal representative of the turning angle of the steering wheel from the straight-ahead position thereof and to produce an output signal when the signal from the wheel-angle sensor means is in a predetermined relationship to the reference signal, differentiating means operative to differentiate the magnitude of the signal from said wheel-angle sensor means with respect to time and to produce an output signal representative of the angular turning velocity of the steering wheel, second comparing means operative to compare said output signal from the differentiating means with a second reference signal representative of a predetermined angular turning velocity of the steering wheel and to produce an output signal when the output signal from the differentiating means is in a predetermined relationship to the second reference signal, and a logic circuit responsive to the respective output signals from the first and second comparing means and operative to produce an output signal when the respective output signals from the first and second comparing means are in predetermined relationship to each other, said control means being operative to detect said predetermined state on the basis of the output signal from said logic circuit.

8. A steering pressure control apparatus as set forth in claim 3, in which said detecting means further comprises first steering condition sensor means provided in conjunction with a movable member of the steering linkage and operative to detect the velocity at which a rockable arm is moved with respect to the body structure of the vehicle and to produce a first steering condition signal representative of the detected velocity of movement of the movable member, second steering condition sensor means operative to detect the angle of a motion of the vehicle body structure about a predetermined axis and to produce a second steering condition signal representative of the detected angle of such a motion of the vehicle body structure, and a detecting circuit comprising first comparing means operative to compare the output signal first steering conditon sensor means with the magnitude of a first reference signal representative of a predetermined velocity of motion of said movable member and to produce an output signal when the output signal from the first steering condition sensor means is in predetermined relationship to the first reference signal, second comparing means operative to compare the output signal from the second steering condition sensor means with a second reference signal representative of a predetermined angle of motion of the vehicle body structure about said axis and to produce an output signal when the output signal from the second steering condition sensor means is in predetermined relationship to the second reference signal, and a logic circuit responsive to the respective output signals from the first and second comparing means and operative to produce an output signal when the respective output signals from the first and second comparing means are in predetermined relationship to each other, said control means being operative to detect said predetermined state on the basis of the output signal from said logic circuit.

9. A steering pressure control apparatus as set forth in claim 4, in which said wheel-position sensor means comprises an elongated member longitudinally movable responsive to rotation of said steering shaft about the center axis of the shaft and formed with a recess which is located in predetermined relationship to the vehicle body structure when the steering wheel is held in the straight-ahead position thereof, a movable member movable toward and away from the elongated member in directions substantially perpendicular to the directions of movement of the elongated member, a pin fixedly carried on said movable member and movable into and out of an axial position projecting into said recess, a stationary member which is fixed with respect to the vehicle body structure and which is positioned opposite to said elongated member across said movable member, an electrically conductive member securely attached to said movable member, a pair of contact elements secured to the stationary member and projecting from the stationary member toward said conductive member, the contact elements being electrically connected to said detecting circuit, and biasing means urging said movable member away from said stationary member so that said conductive member is urged away from said contact elements, said predetermined relationship of said recess with respect to the vehicle body structure being such that said pin is substantially aligned with the recess when the steering wheel is held in the straight-ahead position thereof or in an angular position approximating the straight-ahead position so that the pin is permitted to project into the recess and as a consequence the movable member is caused to move away from said stationary member by said biasing means when the steering wheel is held in the straight-ahead position thereof or in said angular position, said movable member and said pin being moved toward said stationary member and as a consequence said conductive member being brought into contact with said contact elements when said pin is dislodged from said recess.

10. A steering pressure control apparatus as set forth in claim 4, in which said wheel-velocity sensor means comprises a magnet member having a circular cross section and coaxially rotatable with said steering shaft, the magnet member having a plurality of opposite pole portions which are arranged alternately to one another circumferentially of the magnet member, and an electromagnetic pickup element fixed with respect to the vehicle body structure and located in proximity to said magnet member, the pickup element having terminals electrically connected to said detecting circuit.

11. A steering pressure control apparatus as set forth in claim 3, in which said steering power cylinder has formed therein first and second fluid chambers which are separate from each other by a piston, said control means comprising a pressure control valve unit comprising a valve housing formed with an elongated axial cavity, a plurality of ports open to the cavity and consisting of a fluid inlet port communicating with the delivery side of a steering fluid feed pump and first and second fluid outlet ports communicating with the first and second fluid chambers, respectively, of the steering power cylinder, a valve spool axially movable within said cavity in one direction to provide an increasing degree of communication between said fluid inlet port and said first fluid outlet port and a decreasing degree of communication between the fluid inlet port and said second fluid outlet port and in the opposite direction to provide a decreasing degree of communication between said fluid inlet port and said first fluid outlet port and an increasing degree of communication between the fluid inlet port and said second fluid outlet port, and electromagnetically operated actuating means electrically connected to said detecting means and operative to drive said valve spool for longitudinal movement within said cavity in a direction and over a distance controlled on the basis of the output signals from the detecting means.

12. A steering pressure control apparatus as set forth in claim 11, in which said detecting means comprises steering torque sensor means provided in conjunction with the steering shaft and operative to detect a torque with which the steering shaft is turned and to produce an output signal representative of the detected torque imparted to the steering shaft, and differential pressure sensor means responsive to fluid pressures in said first and second fluid outlet ports and operative to detect a difference between the fluid pressures developed in the first and second fluid outlet ports and to produce an output signal representative of the detected differential pressure therebetween, said actuating means being responsive to the output signals from said steering torque sensor means and said differential pressure sensor means and the output signal from said vehicle-speed sensor means and being operative to drive said valve spool on the basis of these signals.

* * * * *